(12) United States Patent
Siegrist et al.

(10) Patent No.: US 7,941,755 B2
(45) Date of Patent: May 10, 2011

(54) METHOD AND APPARATUS FOR WEB PAGE CO-BROWSING

(75) Inventors: Joseph Siegrist, Vienna, VA (US); Andrew Zitnay, Washington, DC (US); Robert Billingslea, Manassas, VA (US)

(73) Assignee: Art Technology Group, Inc., Cambridge, MA (US)

( * ) Notice: Subject to any disclaimer, the term of this patent is extended or adjusted under 35 U.S.C. 154(b) by 1055 days.

(21) Appl. No.: 11/737,729

(22) Filed: Apr. 19, 2007

(65) Prior Publication Data
US 2008/0276183 A1 Nov. 6, 2008

(51) Int. Cl.
*G06F 3/00* (2006.01)

(52) U.S. Cl. ........ 715/760; 715/708; 715/733; 715/736; 715/740; 715/742; 715/744; 715/866

(58) Field of Classification Search .................. 715/760, 715/708, 733, 736, 740, 742, 744, 866
See application file for complete search history.

(56) References Cited

U.S. PATENT DOCUMENTS

| | | | | |
|---|---|---|---|---|
| 5,963,208 | A * | 10/1999 | Dolan et al. .................. | 715/760 |
| 5,983,268 | A * | 11/1999 | Freivald et al. ............... | 709/218 |
| 6,209,038 | B1 * | 3/2001 | Bowen et al. .................. | 709/238 |
| 6,477,578 | B1 * | 11/2002 | Mhoon .......................... | 709/229 |
| 6,707,811 | B2 | 3/2004 | Greenberg et al. | |
| 6,791,974 | B1 | 9/2004 | Greenberg | |
| 6,914,899 | B2 | 7/2005 | Siegrist et al. | |
| 7,000,185 | B1 * | 2/2006 | Murren et al. ................ | 715/203 |
| 7,174,506 | B1 * | 2/2007 | Dunsmoir et al. ............ | 715/207 |
| 7,272,659 | B2 * | 9/2007 | Fukuoka ........................ | 709/231 |
| 7,325,188 | B1 * | 1/2008 | Covington et al. ........... | 715/234 |
| 7,356,606 | B2 * | 4/2008 | Choate .......................... | 709/232 |
| 7,519,902 | B1 * | 4/2009 | Kraft et al. .................... | 715/234 |
| 2002/0054126 | A1 * | 5/2002 | Gamon ......................... | 345/781 |
| 2002/0198903 | A1 * | 12/2002 | Robison et al. ............... | 707/500 |
| 2003/0005282 | A1 * | 1/2003 | Bade .............................. | 713/151 |
| 2003/0033227 | A1 * | 2/2003 | Heiser ............................ | 705/35 |
| 2003/0083938 | A1 * | 5/2003 | Smith et al. ................... | 705/14 |

(Continued)

FOREIGN PATENT DOCUMENTS

EP 0 843 454 A2 5/1998

(Continued)

OTHER PUBLICATIONS

Alan W. Esenther, Instant Co-Browsing: Lightweight Real-time Collaborative Web Browsing, May 7-11, 2002, Mitsubishi Electric Research Laboratories.*

(Continued)

*Primary Examiner* — Boris Pesin
*Assistant Examiner* — John Heffington
(74) *Attorney, Agent, or Firm* — Squire, Sanders & Dempsey (US) LLP

(57) ABSTRACT

A method and apparatus for extracting information from a web page on a standard end user browser without plug-ins, includes the steps of dynamically creating an element on a web page being viewed by an end user, copying at least a portion of the contents of the web page or form field values, and uploading the data to a target domain, wherein the target domain may be different from the domain of the web page. In co-browsing applications, the data uploaded is used to create a copy of the website for display to a third party.

16 Claims, 2 Drawing Sheets

U.S. PATENT DOCUMENTS

| | | | | |
|---|---|---|---|---|
| 2003/0093585 A1* | 5/2003 | Allan | | 709/330 |
| 2003/0101412 A1* | 5/2003 | Eid | | 715/513 |
| 2003/0110266 A1* | 6/2003 | Rollins et al. | | 709/227 |
| 2003/0126134 A1* | 7/2003 | Messing et al. | | 707/10 |
| 2003/0204753 A1* | 10/2003 | Raley et al. | | 713/201 |
| 2004/0075686 A1* | 4/2004 | Watler et al. | | 345/749 |
| 2004/0117349 A1* | 6/2004 | Moricz | | 707/1 |
| 2004/0119727 A1* | 6/2004 | Dietz et al. | | 345/629 |
| 2004/0177127 A1* | 9/2004 | Seraphin | | 709/217 |
| 2004/0201615 A1* | 10/2004 | Dietz et al. | | 345/738 |
| 2004/0258089 A1* | 12/2004 | Derechin et al. | | 370/465 |
| 2004/0267730 A1* | 12/2004 | Dumais et al. | | 707/3 |
| 2005/0162680 A1* | 7/2005 | Sekiguchi et al. | | 358/1.13 |
| 2005/0198572 A1* | 9/2005 | Quiller et al. | | 715/527 |
| 2005/0204281 A1* | 9/2005 | Choate | | 715/513 |
| 2006/0004674 A1* | 1/2006 | Tesser | | 705/74 |
| 2006/0010134 A1* | 1/2006 | Davis et al. | | 707/10 |
| 2006/0053224 A1* | 3/2006 | Subramaniam | | 709/227 |
| 2006/0179155 A1* | 8/2006 | Bunting et al. | | 709/232 |
| 2007/0005685 A1* | 1/2007 | Chau et al. | | 709/203 |
| 2007/0061412 A1 | 3/2007 | Karidi et al. | | |
| 2007/0061421 A1 | 3/2007 | Karidi et al. | | |
| 2007/0061467 A1* | 3/2007 | Essey et al. | | 709/227 |
| 2007/0078810 A1* | 4/2007 | Hackworth | | 707/2 |
| 2007/0156592 A1* | 7/2007 | Henderson | | 705/51 |
| 2007/0186150 A1* | 8/2007 | Rao et al. | | 715/506 |
| 2008/0109472 A1* | 5/2008 | Underwood et al. | | 707/102 |
| 2008/0216174 A1* | 9/2008 | Vogel et al. | | 726/22 |
| 2008/0229233 A1* | 9/2008 | Blattner | | 715/781 |
| 2008/0306794 A1* | 12/2008 | Cohen et al. | | 705/7 |
| 2008/0313306 A1* | 12/2008 | Skog | | 709/218 |
| 2009/0024748 A1* | 1/2009 | Goldspink et al. | | 709/228 |
| 2010/0205551 A1* | 8/2010 | Underwood et al. | | 715/760 |

FOREIGN PATENT DOCUMENTS

| | | | |
|---|---|---|---|
| JP | 2008077225 A | * | 4/2008 |
| WO | WO 02/079911 A2 | * | 10/2002 |

OTHER PUBLICATIONS

Gerosa et al., Symmetric Synchronous Collaborative Navigation, Proceedings of the 2004 IADIS International WWW/Internet Conference, 2004.*

Peter A. Bromberg , Build an ASP.NET Session Timeout Redirect Control, Dec. 28, 2005, www.eggheadcafe.com.*

"Co-Browse: Provide Online Visitors with Hands-On Assistance Whenever They Need It," date unknown, Retrieved Apr. 2, 2007. <http://www.liveperson.com/sb/cobrowse.asp>.

"PageViewer: Tired of Guessing What Your Visitors are Looking at and Trying to Decipher Complex URLs?," date unknown, Retrieved Apr. 2, 2007. <http://www.liveperson.com/sb/pageviewer.asp>.

"Liveperson: Engage your online customers in real time," date unknown, Retrieved Apr. 2, 2007. <http://www.liveperson.com/index.asp>.

"Liveperson: About Us," date unknown, Retrieved Apr. 2, 2007. <http://www.liveperson.com/about/>.

* cited by examiner

METHOD AND APPARATUS FOR WEB PAGE CO-BROWSING

BACKGROUND

The use of the Internet has become widespread over the last decade, and an important use of the Internet is e-commerce. One way in which e-commerce is conducted is through the use of websites with web pages that contain information about products and services being offered for sale by a merchant. Such web pages may or may not provide a mechanism for a consumer to purchase the goods or services "online," that is, via the website. Such websites may provide for such an ability by allowing a user of the website to select goods and services for inclusion in a virtual "shopping cart" and then providing a web page that includes text boxes or other mechanism that allow the user to specify billing and shipping information and provide a means for payment (e.g., a credit card number).

Whether or not a web page offers the opportunity to make purchases online, users of web pages often find themselves in situations in which human assistance is desirable. For example, a user may not be able to locate a desired product or service, on a website, or, even if they have located a product or service on the website, may need information about such a product or service that is not available on the website. A user may also encounter difficulty in navigating the website or in performing some action such as completing an on-line purchase. There are numerous other reasons why a user of a website may require assistance.

One method in which assistance may be rendered to a user of a website is through the provision of an icon which, when activated, will result in the establishment of a phone call or text chat with a customer service agent at a call center. The phone call can be a pure VOIP (voice over internet protocol) phone call, a mixed VOIP-PSTN (public switched telephone network) call, or a pure PSTN call, which can be a "call back" call from a call center directly to a consumer or a "call back" call facilitated by a third party service provider in which the third party service provider places a first call to the user of the website at a number provided by the user and a second call to a call center and then bridges the first call to the second call. Another method in which communication between a user and a customer service agent may be established is through a text chat connection.

When a call or text chat connection is established between a user of a website and a customer service agent, it is desirable for the customer service agent to be able to view the web page being seen by the user so that the customer service agent can assist the user more easily. Doing this without using Java, or other plug-ins is preferable since customers don't have to download anything new, and they don't even have to be notified that they are cobrowsing.

SUMMARY

The aforementioned issues and others are addressed to a great extent by a system and method for extracting data from a web page being viewed by an end user to a target domain (which may be different from the domain of the web page being viewed by the end user), in which JavaScript code (which is preferably downloaded from a third party website using a script source include that is included in the web page) creates an element, preferably an iframe, into which a partial or total "copy" of the webpage (including some or all of the user entered information) is entered, and uploads the element to a third party computer. The information in the element is then used in some embodiments to create a copy of the web page (which may involve combining the data in the element with other data) and the recreated web page is displayed to another person, such as a customer service agent.

Some embodiments determine whether the subject web page is session based or non-session based (i.e., static). This information can be used to determine whether it is necessary to copy the entire contents of the web page (such as for session-based web pages) or whether only the user-changeable portions of the web page need be copied (such as for non-session based web pages). The determination of whether the web page is session based can be made using prior knowledge of the URL. If it is not known whether a particular web page is session based or static, a dynamic test may be used to determine whether the page is static and the result of the dynamic test can be used for a remainder of a co-browsing session. The dynamic test involves uploading the entire contents of the initial page to the co-browsing server, downloading the same URL to the co-browsing server and comparing the downloaded web page to the data in uploaded element. If the data from the uploaded elements matches the data downloaded from the merchant server, the web page is not session based; otherwise, it is session based.

In another aspect of the invention, the web page may include commands which will block the uploading of some portions of the data from the web page to the target domain computer. This feature is useful for sensitive data, such as an end user's social security number and/or credit card number.

DETAILED DESCRIPTION

In the following detailed description, a plurality of specific details, such as methods for establishing calls between a user and a customer service agent and particular JavaScript commands for implementing various functions, are set forth in order to provide a thorough understanding of the preferred embodiments discussed below. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

The embodiments discussed below are believed to be particularly applicable in the context of internet commerce, and in particular, in the context of communication such as a phone call or text chat connection between a customer service representative and an end user in need of assistance and will be discussed primarily in that context herein. However, the various aspects and embodiments of the inventions set forth herein should not be understood to be so limited and may be used for a wide variety of purposes. For example, the ability to co-browse a website with an end user is also useful in the context of IT support (e.g., allowing an IT professional at an IT help desk to co-browse a website with an end user can facilitate the provision of assistance to the end user). The techniques discussed herein can also be used for simply collecting data entered by a user on a website without any co-browsing or other contact with the end user. There are numerous other uses for the techniques set forth herein as will be recognized by those of ordinary skill in the art.

Figure 1:
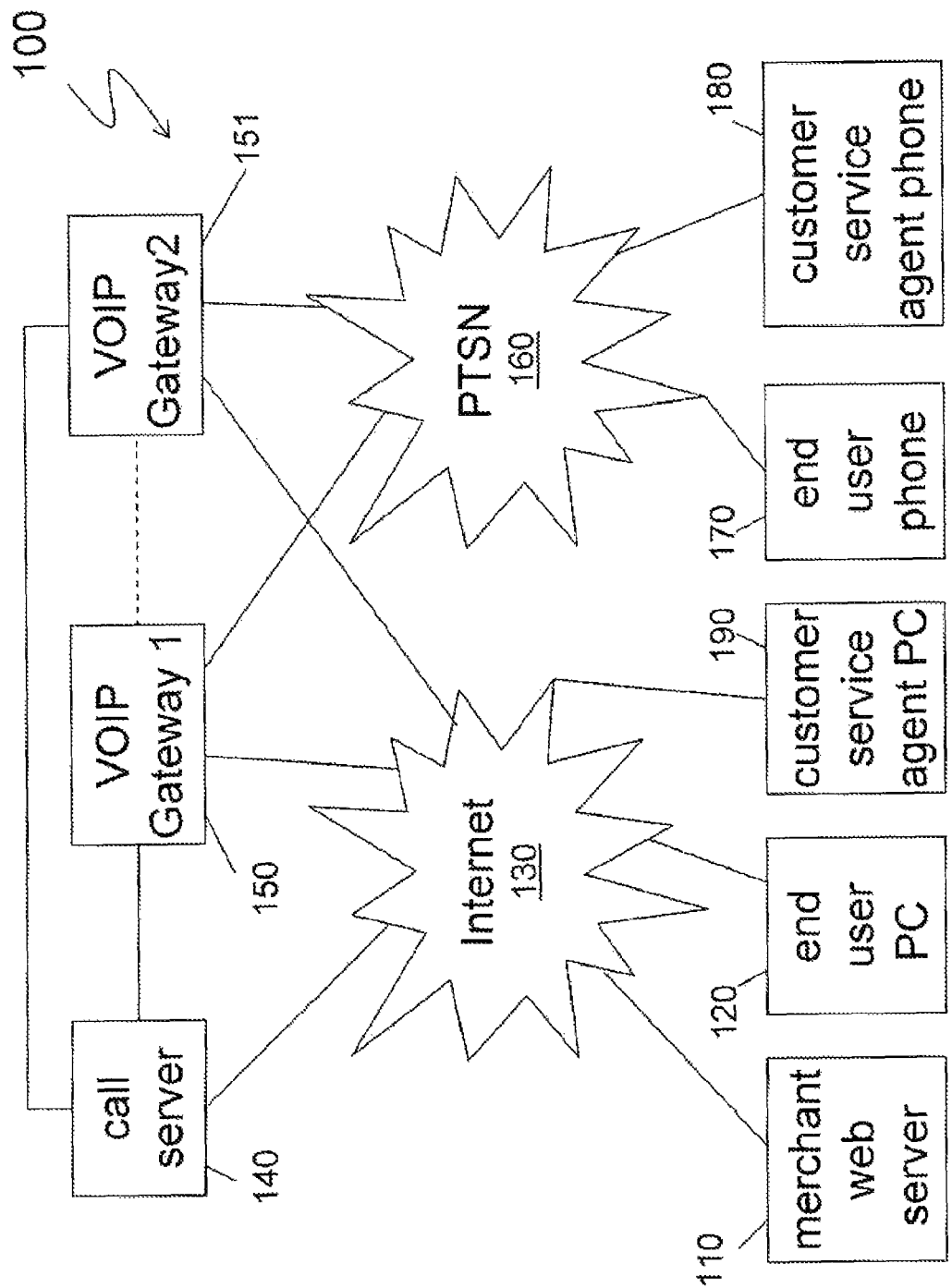
FIG. 1 is a block diagram of a system for co-browsing according to an embodiment of the invention.

FIG. 1 illustrates a system 100 for co-browsing according to an embodiment of the invention. The system 100 includes a merchant web server 110 to which an end user at an end user PC 120 may connect via the Internet 130 to view one or more merchant web pages. In some embodiments of the invention, a web page served by the merchant web server 110 may include a single line of JavaScript code that will download other JavaScript commands to facilitate co-browsing. An example of such a line of code is:

```
<script type='text/JavaScript'
    src='//as00.estara.com/fs/lr.php?accountid=200008070000'></script>
```

This line of code is preferably placed in the website's header, footer, or some other location in the webpage which will ensure that the line of code is always executed when the web page is loaded to the end user PC 120. This code results in the download of additional JavaScript code/commands from the call server 140. (In the description herein, "eStara" refers to the assignee of the present application).

The additional JavaScript code downloaded from the call server 140 may be executed either when the user indicates that communication with a customer service agent is desired, or as soon as it is downloaded from the call server, or at any other suitable time. Alternatively, the downloaded JavaScript code can be included in the web page, thereby avoiding the necessity of downloading the code after the web page from the merchant server 110 is loaded.

In applications in which a third party is providing the co-browsing service to a merchant, providing the merchant with a single line of code to include on its web pages simplifies administration of the web page for the merchant. The use of JavaScript commands is preferable because it allows the collection and transmission of data from a web page on the user's PC 120 to a third party server 140 outside the domain of the merchant web server 110 without the use of a plug-in or other means that would require the user to perform some action.

Figure 2:
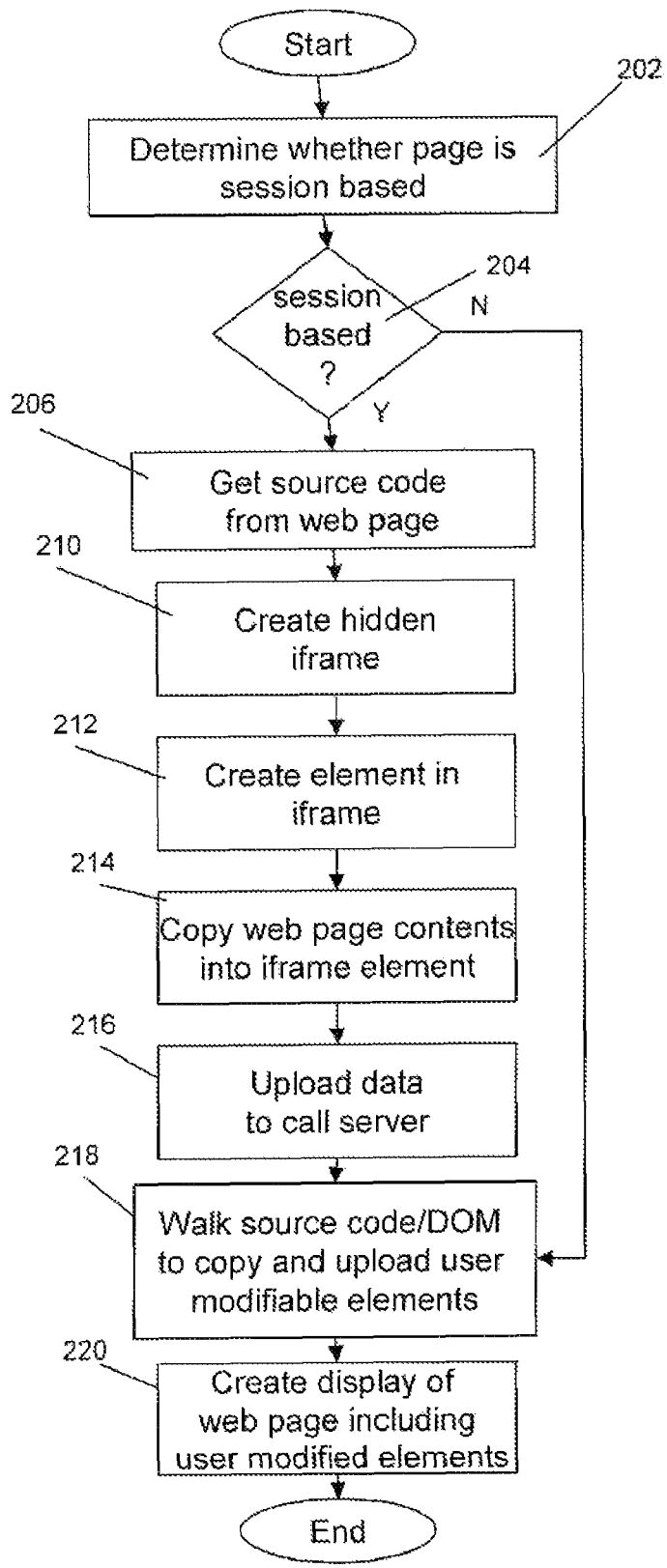
FIG. 2 is a flowchart of a co-browsing process according to an embodiment of the invention.

The downloaded JavaScript commands function to create an element that is preferably invisible to the user, copy some or all of the contents of the web page being viewed by the user at end user PC 120 to the element, and upload the content of the element to a third party to facilitate co-browsing. A cookie with a Globally Unique Identifier is typically used to keep track of this particular customer, and this data is used to link up with a particular customer's cobrowse session. An exemplary method for performing these steps is set forth in the flowchart 200 of FIG. 2 and is further explained in the following paragraphs.

The process begins at step 202 by determining whether the web page is session based or non-session based (i.e., static). If the page is session based at step 204, the source code of the subject web page from the top level page elements (the header and the body of the web page) are copied at step 206. This can be done using JavaScript: document.body.innerHTML and head.innerHTML. It is also desirable to replace all double quotes with an arbitrary unique string that can be turned back into double quotes at the target domain. The following is an exemplary JavaScript command:

```
var data = ('<head>'+document.head.innerHTML+'</head><body>'
    +document.body.innerHTML+'</body>' .replace(/['']/g, '%l22');
```

After the source code for the session based page is obtained at step 206, an iframe with the "src" attribute set to a blank page on the target domain is created at step 210. The iframe is preferably hidden from the user. Such an iframe may be created using the following JavaScript commands (IE refers to the Internet Explorer browser):

```
If (bIE) // IE is won't let you set the name attribute of an iframe unless
you do it like this
    iframe = document.createElement('<iframe name=
    "eStara_tmp_iframe">');
else
    iframe = document.createElement('iframe');
iframe.setAttribute("src", "//as00.estara.com/meet/blank.html");
iframe.setAttribute("scrolling", "no");
iframe.setAttribute("frameBorder", "0");
iframe.setAttribute("id", "eStara_tmp_iframe");
iframe.setAttribute("name", "eStara_tmp_iframe");
iframe.style.border='0px';
iframe.style.width='0px';
iframe.style.height='0px';
```

After the iframe has been created at step 210, an element (referred to as "div" below) is created in the iframe at step 212 and the source code data from the session based web page previously copied at step 206 is copied into the div element at step 214 (those of skill in the art will recognize that it is also possible to copy the source code data directly into the iframe, and that numerous other methods for copying the source code into the iframe may also be used). This can be accomplished, for example, by changing the innerHTML of the element to a form with an input that contains the copied data from the subject web page. The following are exemplary JavaScript commands for performing the foregoing steps:

```
var d:
if(bFirefox) { d=eStara_tmp_iframe.contentDocument.createElement("div");} else
        { d=eStara_tmp_iframe.document.createElement("div");}
d.setAttribute("id", "eStara_tmp_form");
d.innerHTML =    "<form id=\"eStara_upload_form\" name=\"eStara_upload_form\" action=\"" +
                url + "\" method=\"post\" target=\"eStara_tmp_iframe\"><input type=\"hidden\"
                name=\"eStara_bigUpload\" value=\"" + data + "\"></form>";
if(bFirefox) { eStara_tmp_iframe.contentDocument.body.appendChild(d);} else
        { eStara_tmp_iframe.document.body.appendChild(d);}
```

Once the data from the web page has been copied into the element of the iframe at step 214, the data is uploaded to the call server 140 at step 216. This can be accomplished using a JavaScript "submit" command as illustrated below:

```
If(bFirefox)
    {eStara_tmp_iframe.contentDocument.get-
    ElementById('eStara_upload_form').submit( );}
    else { eStara_tmp_iframe.document.get-
    ElementById('eStara_upload_form').submit( );}
```

This results in the uploading of the information from the copied web page to the target domain, which is the call server 140 in this example. The information may be sent from the call server 140 to a computer associated with a customer service agent in order to create a co-browsing display on the customer service agent's computer at step 220 as discussed further below.

The next task is to copy the user-modifiable portions of the web page (in the non-session based case, the other portion of the web page may be downloaded directly from the merchant web server 110 or may be stored in advance on the call server 140). This is accomplished at step 218 by walking the DOM (document object module) in the non-session based case or walking the source code in the session based case and copying the contents of elements such as radio dialogs, text fields, form entries, check boxes, select boxes, etc., that may be modified by the user. The DOM/source code may be walked to obtain the user modifiable data of the web page by first iterating through all the forms in the current document, then checking each form element, and then building a string/containing each form's element number, the name of the form element, and the value of that form element. The string may be unidirectional or bidirectional and may be uploaded using a GET or POST. Exemplary JavaScript commands for performing these tasks are set forth below. This code provides for the blocking of the uploading of fields that contain sensitive data that the operator of the merchant website may wish to hide from the customer service agent. An array called eStara_restriction defines the fields that the merchant wishes to block this array. This array is created dynamically per page, based on what the customer wants to prevent from being sent to the server, e.g. if they have a form element named 'SSN', we'd add SSN to the array to prevent any element named 'SSN' from being added.

```
// Basic idea is to build a string that holds all the form names and values by it, that can be done as a
// GET or POST
// the string contains the form number, element number, element name and element value
// which we can make uni-directional or bidirectional:
var ndata = '?&';
for (var j = 0; j < 100; j++)
  if(document.forms[j] !='undefined)
  {
    var f = document.forms[j];
    for (var i=0;i<f.length;i++)
      {
        var fv = f.elements[i];
        var fn = fv.name;
        var found_restricted = 0;
// In the perfered embodiement some items should be restricted from being sent back up. We set up
// an array called eStara_restriction to do that
            for (var restrict in eStara_restriction) {
                if(!found_restricted) {
                    var re = new RegExp(eStara_restriction[restrict]);
                    var m = fn.match(re);
                    if (m) {found_restricted=1;}
                }
            }
            // Found a restriction, skip to the next form name.
            if(found_restricted>0) { continue; }
            if(typeof(fv.type) != "undefined")
              if(fv.type != "textarea" && fv.type != "submit" && fv.type != "hidden")
              {
                ndata += j + "-" + i + "-" + eStara_urlencode(fv.name) + "=";
                if(fv.type == "radio")
                    ndata += eStara_urlencode(eStara_get_radio(fv));
                else if(fv.type == "select-one" || fv.type == "dropdown")
                    ndata += fv.selectedIndex;
                else if(fv.type == "checkbox")
                    ndata += fv.checked;
                else if(fv.type == "text" || fv.type == "hidden")
                    ndata += eStara_urlencode(fv.value);
                else {
                    ndata += eStara_urlencode(fv.value);
                }
                ndata += "&";
              }
          }
    }
// function to get which radio button is selected if any
function eStara_get_radio(r)
{
    var i=0;
    var rl=r.length;
    if(rl == "undefined" || typeof(rl) == "undefined")
```

```
            if(r.checked)
                return r.value;
            else
                return "";
        for(i=0;i<rl;i++)
            if(r[i].checked)
                return r[i].value;
        return "";
}
```

As discussed above, the aforementioned functions may be implemented at any time after the web page is downloaded at the end user PC 120. This process is preferably repeated every few seconds to gather up all changes to make this process feel like cobrowsing. If it's found that there are no changes, you can avoid sending any information. When someone joins a cobrowse, they do so with a URL that includes the Globally Unique Identifier (GUID).

This identifier allows the server id determine if this particular user is on a session based page which must be downloaded from the cobrowse server or if the agent can go directly to the original web page URL. In either case the JavaScript include has commands that recognizes this is a cobrowse session for the GUID passed in which allows the cobrowsing link up.

In some embodiments, one or more of the merchant web pages on the merchant web server 110 includes a provision, such as an icon, for establishing communications between the user and a customer service agent. In some embodiments, the process described above in connection with FIG. 2 is executed when the user activates the icon for establishing communications with the customer service agent. In this way, the data representing the web page may is available when the communication is established or as shortly thereafter as possible. As discussed above, co-browsing information is initiated without asking permission from the user (and may be performed such that it is invisible to the user) in some embodiments, whereas permission is requested from the user in some embodiments.

One type of communication between a user and a customer service agent that can be established is a phone call, which may be a pure VOIP (voice over internet protocol) phone call, a mixed VOIP-PSTN phone call, or a pure PSTN (public switched telephone network) phone call, which can be a "call back" call from a call center directly to a consumer or a "callback" call facilitated by a third party service provider in which the third party service provider places a first call to the user of the website at a number provided by the user and a second call to a call center and then bridges the first call to the second call. Examples of various methods in which such calls can be established can be found in U.S. Pat. Nos. 6,707,811; 6,791,974; 6,914,899; 6,144,670; 5,889,774; and 6,026,087; the contents of which are hereby incorporated by reference. A second method type of communication between a user and a customer service agent is a chat-room dialog between the user of the website and a customer service agent. A method for establishing such a connection is described in U.S. Pat. No. 6,914,899. In additions to the methods described in the foregoing patents, there are various other methods for establishing communications between a user of a website and a customer service agent.

Thus, for example, the merchant web page may include a CLICK TO CALL™ icon that, when activated, provides a click to call process provided by eStara, Inc. The CLICK TO CALL™ process presents the user with the option to enter a PSTN phone number at which the user wishes to be called (referred to in the art as "callback"), or the option to establish a VOIP phone call from the end user PC 120 to a customer service agent. If the user selects the call back option, a message is sent from the end user PC 320 to the call server 140 which causes the call server 140 to control a first VOIP gateway 150 to establish a PSTN call to the end user's phone 170 and a second VOIP gateway 151 to establish a PSTN call to the customer service agents' phone 180, and then bridges the two calls by setting the input of the VOIP gateway 150 to the output of the second VOIP gateway 151. In this scenario, the aforementioned data extraction process illustrated in FIG. 2 can begin immediately after the callback icon is activated, so that the information from the web page being viewed on the end user PC 120 can be sent uploaded to the call server 140 and then sent from the call server 140 to a customer service agent computer 190 associated with the customer service agent to facilitate co-browsing.

If the user chooses to establish a VOIP phone call from the end user PC 120 to a customer service agent, a thin client VOIP applet is downloaded to the end user PC 120. The applet establishes a VOIP call to a phone number indicated in the icon, which may be a PSTN or a VOIP target. If the target is a PSTN, the applet will cause packets including voice data to be exchanged with one a VOIP gateway 150 under control of the call server 140. The VOIP gateway 150 will establish a PSTN call to the customer service agent phone 180 and will translate the voice data packets to a form suitable for transmission over the PSTN. If the target is a VOIP call, the call server can facilitate the exchange of VOIP packets between the end user PC 120 and customer service agent computer 190. In either scenario, the aforementioned data extraction process illustrated in FIG. 2 can begin immediately after the call icon is activated, so that the information from the web page being viewed on the end user PC 120 can be uploaded to the call server 140 and then sent from the call server 140 to customer service agent computer 190 to facilitate co-browsing as quickly as possible.

Similarly, the merchant web page may include a PUSH TO CHAT™ icon that will establish a chat connection between an end user and a customer service agent in a manner well known in the art. As discussed above, the data extraction process illustrated in FIG. 2 can be begun as soon as the PUSH TO CHAT™ icon is activated so that the web page data can be sent to the customer service agent computer 190 to facilitate co-browsing.

It will be apparent to those of skill in the art that numerous variations in addition to those discussed above are also possible. Therefore, while the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computerized method performed by an end user computer for extracting data from a web page downloaded by an end user or entered by the end user after page load by text or action at the end user computer comprising the steps of:
   dynamically creating an element on the web page being viewed by a user at the end user computer;
   determining whether the web page is session based;
   copying at least a portion of the contents of the web page into the element or the element's src parameter; and
   uploading the copied contents to a third party;
   wherein the entire contents of the web page are copied if the web page is session based.

2. The method of claim 1, wherein the dynamically creating and using steps are implemented using JavaScript commands.

3. The method of claim 2, wherein the element is an iframe.

4. The method of claim 2, wherein the data is uploaded using a POST or a GET.

5. The method of claim 1, further comprising the step of:
   using the data to create a copy of the web page being viewed by the user for display to a third party.

6. The method of claim 1, further comprising the step of asking the user's permission before performing at least one of the dynamically creating and using steps.

7. The method of claim 1, wherein the element is hidden.

8. A computerized method performed by an end user computer for extracting data from a web page downloaded by an end user or entered by the end user after page load by text or action at the end user computer comprising the steps of:
   dynamically creating an element on the web page being viewed by a user at the end user computer;
   determining whether the web page is session based;
   copying at least a portion of the contents of the web page into the element or the element's src parameter; and
   uploading the copied contents to a third party;
   wherein only portions of the web page that can be modified by a user are copied if the web page is not session based.

9. The method of claim 8, wherein the dynamically creating and using steps are implemented using JavaScript commands.

10. The method of claim 9, wherein the element is an iframe.

11. The method of claim 9, wherein the data is uploaded using a POST or a GET.

12. The method of claim 8, further comprising the step of:
    using the data to create a copy of the web page being viewed by the user for display to a third party.

13. The method of claim 8, further comprising the step of asking the user's permission before performing at least one of the dynamically creating and using steps.

14. The method of claim 8, wherein the element is hidden.

15. An end user system for extracting data from a web page, the data being downloaded by an end user or entered by the end user after page load by text or action at the end user system comprising:
    a communications port; and
    a processor connected to the communications port and configured to perform the steps of
      dynamically creating an element on the web page being viewed by a user at the end user computer;
      determining whether the web page is session based;
      copying at least a portion of the contents of the web page into the element or the element's src parameter; and
      uploading the copied contents to a third party;
    wherein the entire contents of the web page are copied if the web page is session based.

16. An end user system for extracting data from a web page, the data being downloaded by an end user or entered by the end user after page load by text or action at the end user system comprising:
    a communications port; and
    a processor connected to the communications port and configured to perform the steps of
      dynamically creating an element on the web page being viewed by a user at the end user computer;
      determining whether the web page is session based;
      copying at least a portion of the contents of the web page into the element or the element's src parameter; and
      uploading the copied contents to a third party;
    wherein only portions of the web page that can be modified by a user are copied if the web page is not session based.

* * * * *